US011097838B2

United States Patent
Groninga et al.

(10) Patent No.: US 11,097,838 B2
(45) Date of Patent: Aug. 24, 2021

(54) DUCT WITH OPTIMIZED HORIZONTAL STATOR SHAPE

(71) Applicant: Bell Textron Inc., Fort Worth, TX (US)

(72) Inventors: Kirk L. Groninga, Keller, TX (US); Daniel B. Robertson, Southlake, TX (US); Matthew E. Louis, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 225 days.

(21) Appl. No.: 16/442,180

(22) Filed: Jun. 14, 2019

(65) Prior Publication Data
US 2020/0391861 A1    Dec. 17, 2020

(51) Int. Cl.
*B64C 29/00* (2006.01)
*B64C 27/52* (2006.01)
*B64C 27/22* (2006.01)
*B64C 11/00* (2006.01)

(52) U.S. Cl.
CPC ........ *B64C 29/0033* (2013.01); *B64C 11/001* (2013.01); *B64C 27/22* (2013.01); *B64C 27/52* (2013.01); *B64C 29/0016* (2013.01); *B64C 2201/162* (2013.01)

(58) Field of Classification Search
CPC .......... B64C 2201/162; B64C 29/0016; B64C 11/001
See application file for complete search history.

(56) References Cited

U.S. PATENT DOCUMENTS

| 1,990,308 | A | * | 2/1935 | Phillips ................. B64C 11/001 244/15 |
| 3,181,810 | A | | 5/1965 | Olson |
| 5,035,377 | A | * | 7/1991 | Buchelt ............... B64C 29/0016 244/12.1 |
| 10,252,797 | B2 | | 4/2019 | Vondrell et al. |
| 10,501,173 | B1 | | 12/2019 | Douglas et al. |
| 10,988,248 | B2 | | 4/2021 | Mikić et al. |
| 2003/0094537 | A1 | | 5/2003 | Austen-Brown |
| 2011/0168835 | A1 | | 7/2011 | Oliver |

(Continued)

FOREIGN PATENT DOCUMENTS

| EP | 3647193 A1 | 5/2020 | |
| FR | 1534814 A | * 8/1968 | ............... B64C 9/00 |

(Continued)

OTHER PUBLICATIONS

Groninga, Kirk L., et al.; "VTOL Aircraft With Tilting Rotors and Tilting Ducted Fans"; U.S. Appl. No. 16/442,288, filed Jun. 14, 2019; 41 pages.

*Primary Examiner* — Richard R. Green
*Assistant Examiner* — William L Gmoser
(74) *Attorney, Agent, or Firm* — Shackelford, Bowen, McKinley & Norton, LLP

(57) ABSTRACT

An exemplary ducted fan with an optimized stator includes a duct surrounding a rotor hub from which blades radially extend and the stator having a stator span extending horizontally across an inside diameter of the duct, the stator having a stator chord extending from a leading edge to a trailing edge, wherein a length of the stator chord varies across the stator span.

20 Claims, 5 Drawing Sheets

(56) References Cited

U.S. PATENT DOCUMENTS

| | | |
|---|---|---|
| 2011/0180671 A1* | 7/2011 | Campbell ............... B64C 27/20 |
| | | 244/23 D |
| 2012/0091257 A1 | 4/2012 | Wolff et al. |
| 2013/0206921 A1* | 8/2013 | Paduano ................. B64C 13/16 |
| | | 244/7 C |
| 2015/0102175 A1 | 4/2015 | Guetta |
| 2015/0197335 A1 | 7/2015 | Dekel et al. |
| 2015/0274292 A1 | 10/2015 | DeLorean |
| 2015/0314865 A1 | 11/2015 | Bermond et al. |
| 2016/0229531 A1 | 8/2016 | Robertson et al. |
| 2017/0369161 A1 | 12/2017 | Alzahrani |
| 2018/0105279 A1 | 4/2018 | Tighe et al. |
| 2018/0281936 A1 | 10/2018 | Robertson et al. |
| 2019/0031333 A1 | 1/2019 | Groninga et al. |
| 2019/0100303 A1 | 4/2019 | Campbell |
| 2019/0100313 A1 | 4/2019 | Campbell |
| 2019/0100322 A1 | 4/2019 | Schank |
| 2019/0135425 A1 | 5/2019 | Moore et al. |
| 2019/0315471 A1 | 10/2019 | Moore et al. |
| 2019/0329882 A1 | 10/2019 | Baity et al. |
| 2019/0339334 A1 | 11/2019 | Mikolajczak |
| 2020/0148347 A1 | 5/2020 | Bevirt et al. |
| 2020/0269975 A1 | 8/2020 | Fink et al. |
| 2020/0285251 A1 | 9/2020 | Anishchenko et al. |
| 2020/0355085 A1* | 11/2020 | Lemarchand ......... F04D 29/663 |
| 2020/0361622 A1 | 11/2020 | Groninga et al. |
| 2020/0398983 A1 | 12/2020 | Singh et al. |
| 2021/0107640 A1 | 4/2021 | Baity et al. |
| 2021/0114723 A1 | 4/2021 | Wittmaak, Jr. et al. |

FOREIGN PATENT DOCUMENTS

| | | |
|---|---|---|
| GB | 757279 A | 9/1956 |
| GB | 981591 A | 1/1965 |
| WO | WO-2017184742 A1 | 10/2017 |

* cited by examiner ized stator shape

TECHNICAL FIELD

This disclosure relates in general to the field of aircraft, and more particularly, to aircraft implementing ducted fans.

BACKGROUND

This section provides background information to facilitate a better understanding of the various aspects of the disclosure. It should be understood that the statements in this section of this document are to be read in this light, and not as admissions of prior art.

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, utilize openly exposed proprotors, which may present a number of drawbacks. For example, openly exposed proprotors can lead to blade tip thrust losses during flight, thrust vectoring capabilities are limited and use of pressure differentials to augment thrust is limited.

SUMMARY

An exemplary ducted fan with an optimized stator includes a duct surrounding a rotor hub from which blades radially extend and the stator having a stator span extending horizontally across an inside diameter of the duct, the stator having a stator chord extending from a leading edge to a trailing edge, wherein a length of the stator chord varies across the stator span.

An exemplary aircraft having a vertical takeoff and landing (VTOL) flight mode and a forward flight mode includes a first wing extending laterally in a first direction from a fuselage and having a wing tip distal from the fuselage; a first tiltable ducted fan coupled to the first wing at the wing tip; a second wing extending laterally in a second direction from the fuselage and having a wing tip distal from the fuselage; a second tiltable ducted fan coupled to the second wing at the wing tip, wherein each of the first and the second tiltable ducted fans includes a duct surrounding a rotor hub from which blades radially extend; and a stator having a stator span extending horizontally across an inside diameter of the duct, the stator having a stator chord extending from a leading edge to a trailing edge, wherein a length of the stator chord varies across the stator span.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
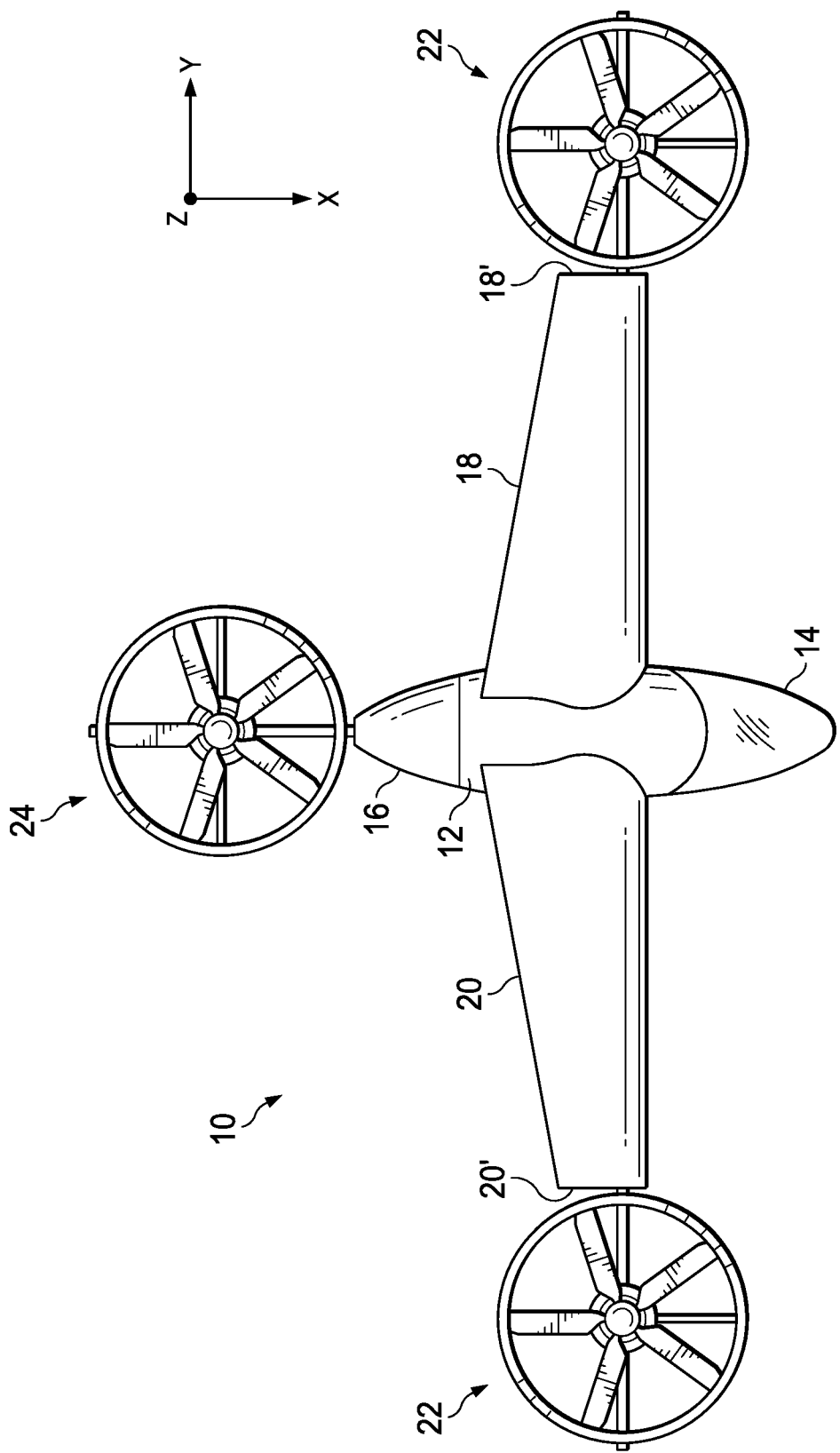
FIG. 1 illustrates a top view of an exemplary aircraft in hover mode.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Figure 2:
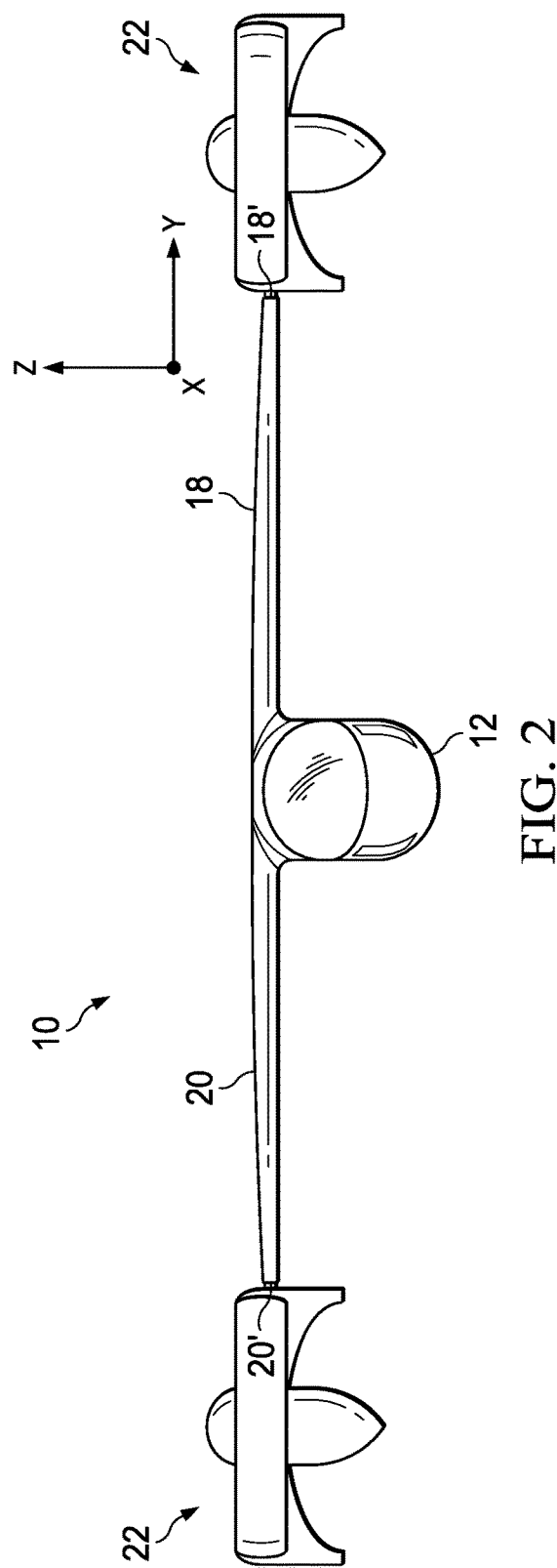
FIG. 2 illustrates a front view of an exemplary aircraft in hover mode.
Figure 3:
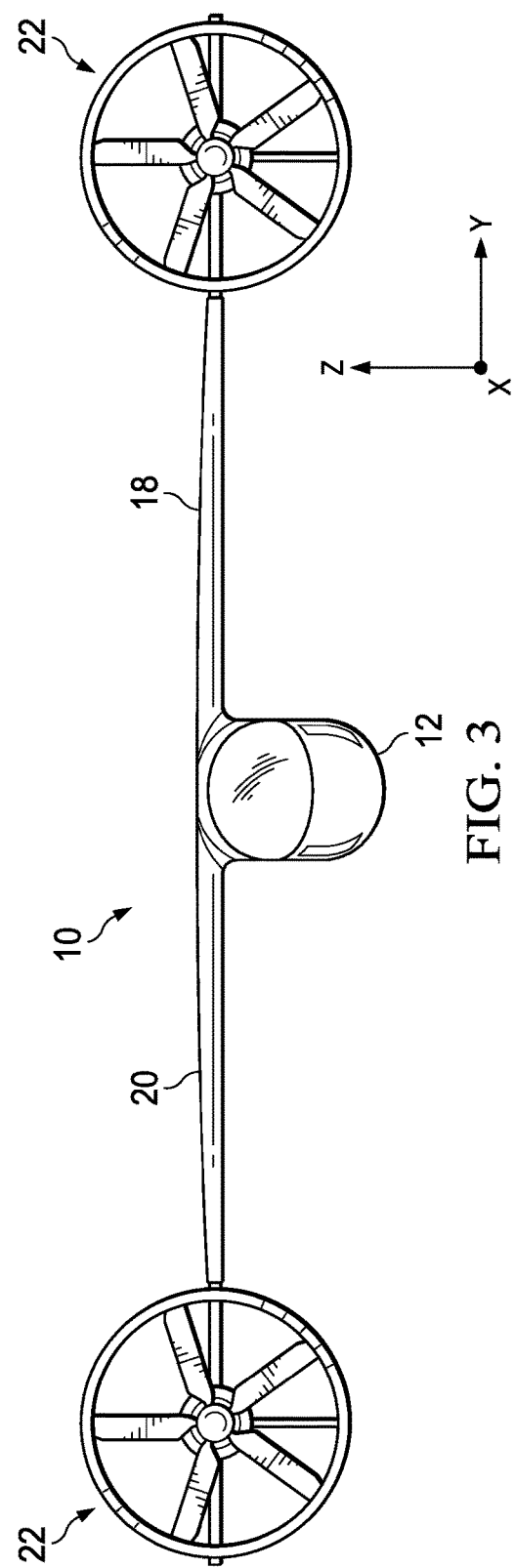
FIG. 3 illustrates a front view of an exemplary aircraft in airplane mode.

FIGS. 1-3 depict three mutually orthogonal directions X, Y, and Z forming a three-dimensional frame of reference XYZ. Longitudinal axis X corresponds to the roll axis that extends through the center of aircraft 10 in the fore and after directions. Transverse axis Y is perpendicular to longitudinal axis X and corresponds to the pitch axis (also known as a control pitch axis or "CPA"). The X-Y plane is considered to be "horizontal." Vertical axis Z is the yaw axis and is oriented perpendicularly with respect to the X-Y plane. The X-Z plane and Y-Z plane are considered to be "vertical."

FIGS. 1-3 illustrate an exemplary vertical takeoff and landing (VTOL) aircraft 10 in different flight modes. FIGS. 1 and 2 illustrate an exemplary aircraft 10 in a VTOL or hover mode and FIG. 3 illustrates aircraft 10 in a forward flight or airplane mode. Aircraft 10 includes a fuselage 12 as a central main body. Fuselage 12 extends parallel to longitudinal axis X from a fuselage front end 14 to fuselage rear end 16. Aircraft 10 has a wing 18 and a wing 20 extending laterally in opposite directions from fuselage 12 generally parallel to the transverse axis Y to respective wing tips 18' and 20'. Aircraft 10 includes a rotary propulsion system incorporating tiltable ducted fans 22 located at wing tips 18' and 20'. Tiltable ducted fans 22 may be tilted between a horizontal orientation in the hover mode and a vertical orientation in the airplane mode. Tiltable ducted fans 22 may also pivot, in particular in the hover mode, to provide yaw control by differential left and right ducted fan tilt. The illustrated exemplary aircraft 10 includes a tail rotor 24, illustrated as a ducted fan. Teachings of certain embodiments recognize that tail rotor 24 may represent one example of a rotor; other examples include, but are not limited to, tail propellers, and fans mounted inside and/or outside the aircraft. It should be appreciated that teachings herein apply to manned and unmanned vehicles and aircraft including without limitation airplanes, rotorcraft, hovercraft, helicopters, and rotary-wing vehicles.

Figure 4:
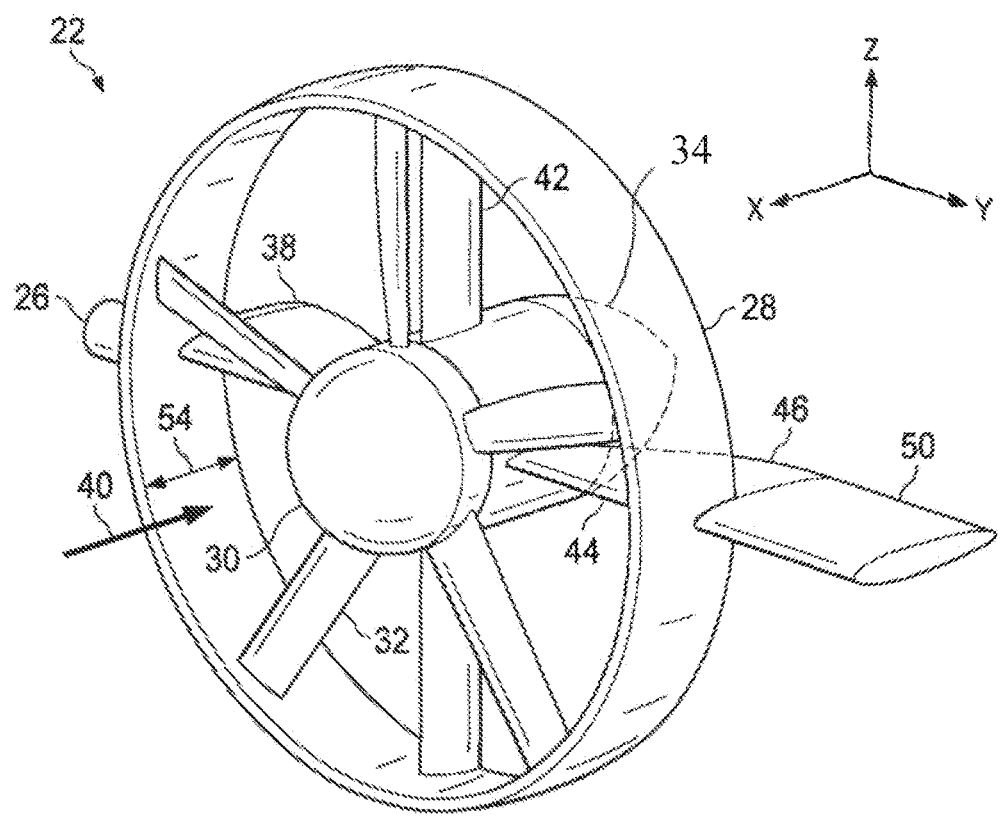
FIG. 4 illustrates an exemplary ducted fan with an optimized stator according to one or more aspects of the disclosure.
Figure 5:
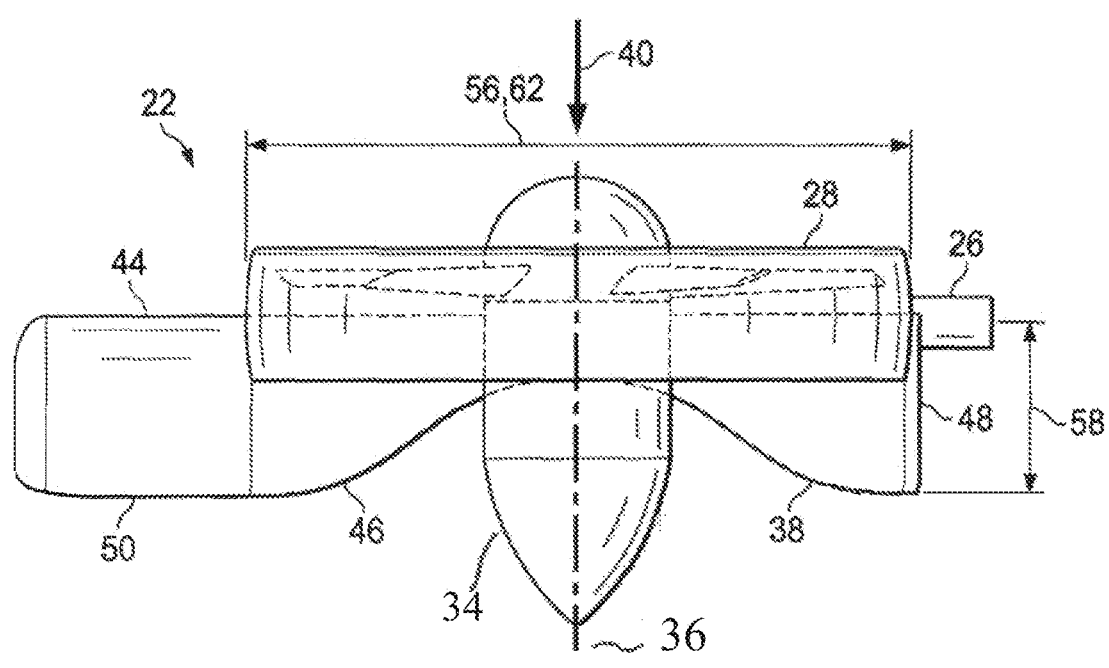
FIG. 5 illustrates another view of an exemplary ducted fan with an optimized stator according to one or more aspects of the disclosure.
Figure 6:
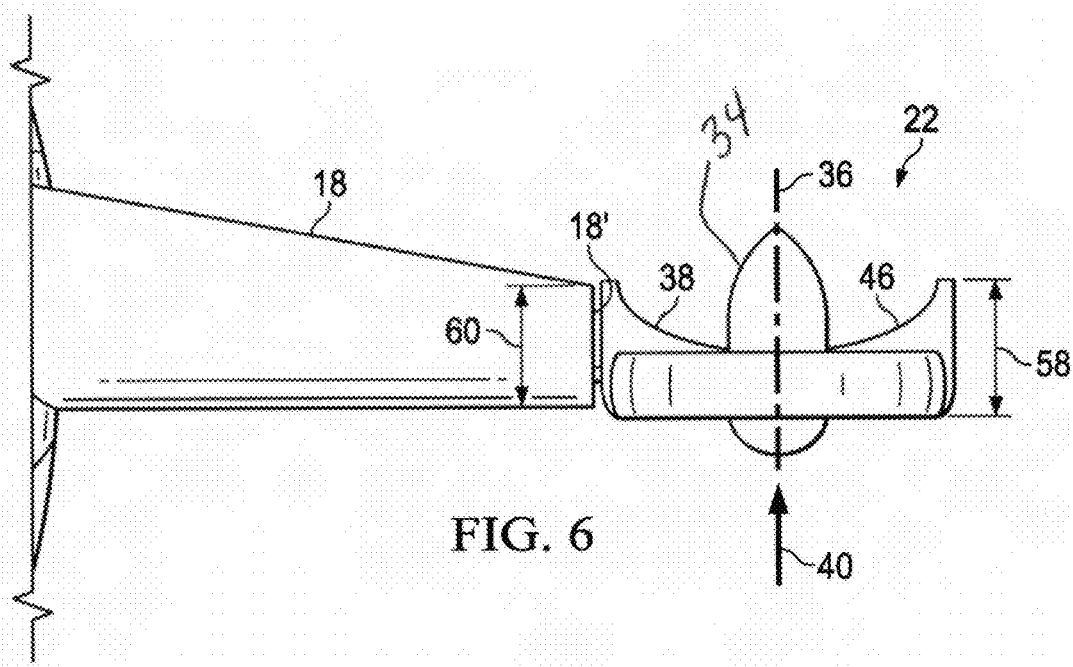
FIG. 6 illustrates another exemplary ducted fan with an optimized stator coupled at a wing tip of an aircraft.

With additional reference to FIGS. 4-6, ducted fans 22 are supported by a rotatable shaft 26 extending at least partially through respective wings 18, 20. Ducted fan 22 includes a duct 28 that surrounds, or partially encloses, a rotor hub 30 from which a plurality of blades 32 radially extend. Blades 32 can be collectively manipulated to control direction, thrust and lift of aircraft 10. The collective pitch of blades 32 may be independently controlled from one another to allow for different thrusts by each ducted fan 22. Rotor hub 30 may include a nacelle 34 housing a power supply such as an electric or hydraulic motor. Nacelle 34 extends behind hub 30 along the axis of rotation 36 of blades 32. Nacelle 34 may extend beyond, exterior of, duct 28 at the minimum stator chord 58 length.

Ducted fan 22 includes a horizontal stator 38 or vane 38 that is generally parallel to the wings 18, 20. Stator 38 is located behind blades 32 in the direction of airflow 40 and located in duct 28 to reduce or eliminate the swirl and torque produced by blades 32. Stator 38 may also provide structural integrity. Ducted fan 22 may include one or more stabilizer or strut members 42 coupling nacelle 34 to duct 28 for structural integrity.

Figure 8:
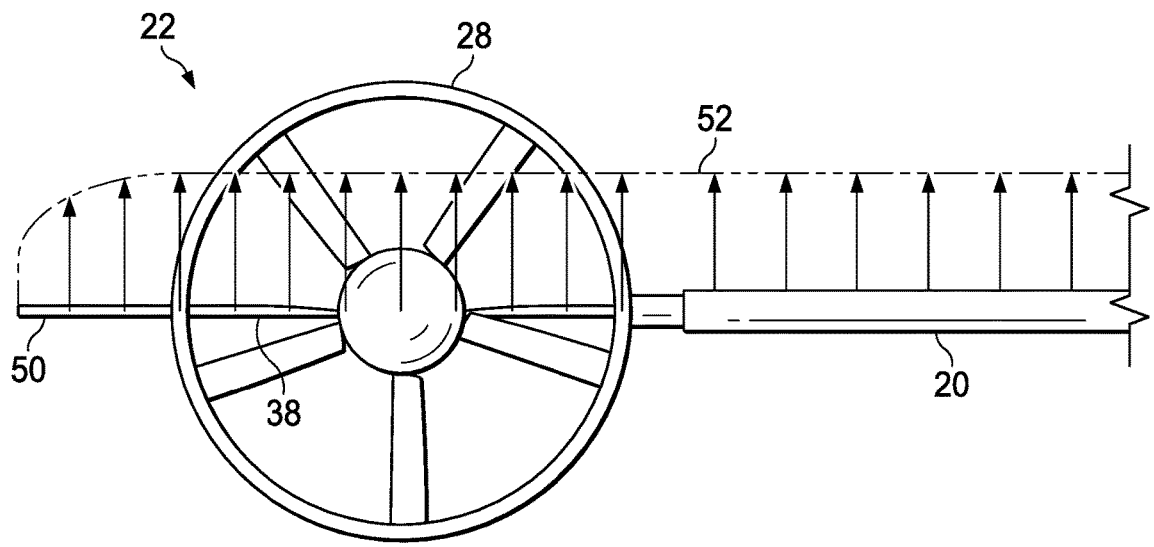
FIG. 8 illustrates an exemplary lift distribution across a wing having an exemplary ducted fan with an optimized stator.

Stator 38 has an airfoil shape and extends along stator chord 58 from the leading edge 44 to the trailing edge 46 and a span 56 across the inside diameter 62 of duct 28. The length of chord 58 varies along the length of span 56 within inside diameter 62 of duct 28 as opposed to having a constant, or substantially constant chord length as in the prior art rectangular stators. As will be understood with reference to the various illustrated examples, stator 38 may include one or more extended portions positioned exterior of duct 28. For example, a rib portion 48 located at the wing tip and/or a tip end portion 50 located exterior of duct 28 opposite from the wing tip. Exterior portions 48, 50 have an airfoil shape and may be incorporated to reduce lift discontinuity and for example to achieve or approach an elliptical lift distribution across the full span of the wing as illustrated in FIG. 8. For example, in FIGS. 3, 4 and 8, stator 38 includes an extended-length tip end portion 50 to create a lift distribution 52 approaching elliptical.

Figure 7:
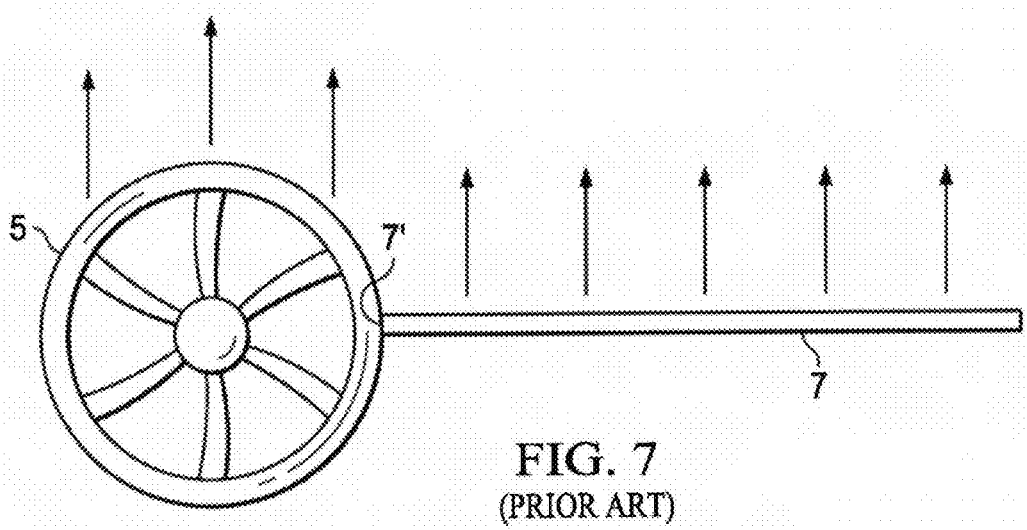
FIG. 7 illustrates a lift distribution across wing having a prior art ducted fan.

Refer now to FIG. 7 illustrating the lift distribution of a prior art ducted fan 5 coupled at a wing tip 7' of wing 7. As recognized, prior art ducted fan 5 acts similar to a ring wing and creates an undesirable non-uniform lift distribution across the span of wing 7 and ducted fan 5. Ducted fan 22 with an optimized stator 38 is configured to reduce the induced drag created by the prior art ducted fans and to provide a more uniform and less disrupted lift distribution 52 as illustrated for example in FIG. 8 along the full span of the wing. In FIG. 8, ducted fan 22 with an optimized stator 38 produces a generally uniform lift distribution across the stator span and the diameter of the duct as opposed to the un-uniform lift distribution across the prior art ducted fan 5 in FIG. 7. Additionally, stator 38 in FIG. 8 includes tip end portion 50 extending radially outside of duct 28 opposite wing 20 to produce a lift distribution across wing 20 and ducted fan 22 approaching an elliptical lift distribution 52. It will be recognized by those skilled in the art with reference to this disclosure, that lift distribution 52 may not be an elliptical lift distribution.

Referring in particular to FIGS. 4-6 and 8, ducted fan 22 with an optimized stator 38 is configured to minimize the discontinuity in the lift distribution 52 across the span of the wing and to improve cruise efficiency. Ducted fan design traditionally focuses on static hover capabilities and ducted fan 22 with optimized stator 38 is configured to increase cruise efficiency. According to an aspect, chord length 54 of duct 28, as related to duct diameter, is reduced relative to the duct chord length of a traditional ducted fan. Additionally, trailing edge 46 of stator 38 extends outside of and behind duct 28. Stator 38 may be shaped to achieve or approach a desired lift distribution. For example, stator 38 has a span 56 generally equal to the inside diameter of duct 28 and has a chord length 58 extending from leading edge 44 to trailing edge 46. Chord length 58 varies across stator span 56 for example to form a scalloped or parabolic trailing edge 46 shape with a chord length 58 at the axis of rotation 36 being less than the chord length 58 at duct 28, i.e., distal ends of stator span 56. The center of duct 28 corresponds to axis of rotation 36. For example, with reference to FIG. 6, stator chord length 58 at duct 28 may be approximate to the chord length 60 of wing tip 18'. The minimum stator chord 58 length may be at axis of rotation 36.

Figure 9:
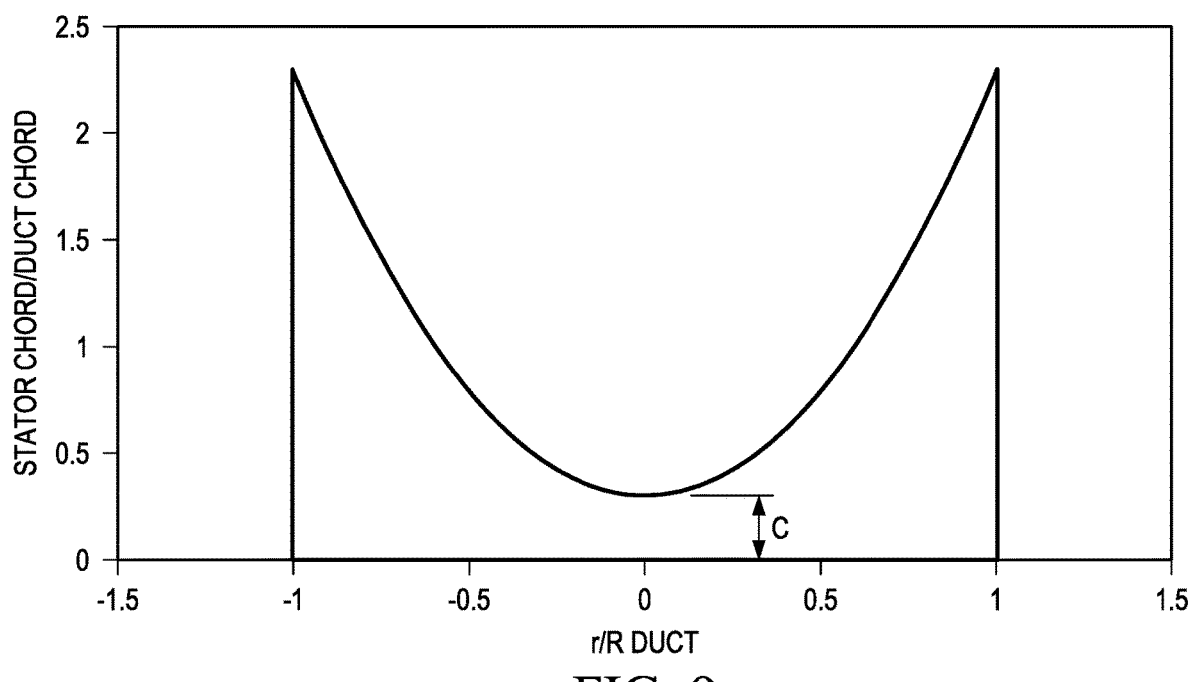
FIG. 9 is a graphic illustration of a parabolic shape of an exemplary optimized stator.

In accordance with an embodiment, the shape of optimized stator 38 shown for example in FIG. 9 may be defined with the equation [1] below.

$$C_S = 2(a_R/a_S)(r/R)^2 + c \qquad [\text{eq. 1}]$$

Where:
$C_S$=the chord of the stator/vane 38;
$a_R$=the lift curve slope for the duct 28;
$a_S$=the lift curve slope of the stator/vane 38;
r=the horizontal distance from the centerline (axis of rotation 36) of duct (28);
R=the radius of duct 28; and
c=a structural offset in the longitudinal (axis X) direction, equal to or greater than 0.

The shape of optimized stator 38 may be determined by equation 1 and then manufactured in according to a linear approximation.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A ducted fan comprising:
a duct surrounding a rotor hub coupled to a nacelle and from which blades radially extend;
a stator extending outside the nacelle and having a stator span extending horizontally across an inside diameter of the duct, the stator having a stator chord extending from a substantially linear leading edge to a trailing edge; and
wherein a length of the stator chord varies across the stator span such that the trailing edge is concave relative to the leading edge along at least part of the stator span.

2. The ducted fan of claim 1, wherein the trailing edge extends exterior of the duct.

3. The ducted fan of claim 1, wherein the trailing edge is parabolic shaped with a minimum stator chord length nearest an axis of rotation of the blades.

4. The ducted fan of claim 1, wherein the trailing edge extends exterior of the duct; and
the trailing edge is parabolic shaped with a minimum stator chord length nearest an axis of rotation of the blades.

5. The ducted fan of claim 1, wherein the stator is shaped to produce an optimized lift distribution in forward flight.

6. The ducted fan of claim 1, wherein the duct is configured to connect at a wing tip, and the stator further comprising a tip end portion located radially exterior of the inside diameter of the duct opposite the wing tip.

7. The ducted fan of claim 1, further comprising a nacelle extending from the rotor hub along an axis of rotation of the blades, wherein:
the nacelle extends exterior of the duct; and
the trailing edge is parabolic shaped with a minimum stator chord length nearest an axis of rotation of the blades.

8. The ducted fan of claim 7, wherein the duct is configured to connect at a wing tip, and the stator further comprising a tip end portion located radially exterior of the inside diameter of the duct opposite the wing tip.

9. The ducted fan of claim 7, wherein the stator is shaped to produce an optimized lift distribution in forward flight.

10. The ducted fan of claim 9, wherein the duct is configured to connect at a wing tip, and the stator further comprising a tip end portion located radially exterior of the inside diameter of the duct opposite the wing tip.

11. An aircraft having a vertical takeoff and landing (VTOL) flight mode and a forward flight mode, the aircraft comprising:
a first wing extending laterally in a first direction from a fuselage and having a wing tip distal from the fuselage;
a first tiltable ducted fan coupled to the first wing at the wing tip;
a second wing extending laterally in a second direction from the fuselage and having a wing tip distal from the fuselage;
a second tiltable ducted fan coupled to the second wing at the wing tip; and
wherein each of the first and the second tiltable ducted fans comprises:

a duct surrounding a rotor hub coupled to a nacelle and from which blades radially extend;

a stator extending outside the nacelle and having a stator span extending horizontally across an inside diameter of the duct, the stator having a stator chord extending from a substantially linear leading edge to a trailing edge; and wherein a length of the stator chord varies across the stator span such that the trailing edge is concave relative to the leading edge along at least part of the stator span.

12. The aircraft of claim 11, wherein the trailing edge extends exterior of the duct.

13. The aircraft of claim 11, wherein the trailing edge is parabolic shaped with a minimum stator chord length nearest an axis of rotation of the blades.

14. The aircraft of claim 11, wherein:

the trailing edge extends exterior of the duct; and the trailing edge is parabolic shaped with a minimum stator chord length nearest an axis of rotation of the blades.

15. The aircraft of claim 11, wherein the stator further comprising a tip end portion located radially exterior of the inside diameter of the duct opposite the wing tip.

16. The aircraft of claim 15, wherein:

the trailing edge extends exterior of the duct; and the trailing edge is parabolic shaped with a minimum stator chord length nearest an axis of rotation of the blades.

17. The aircraft of claim 11, further comprising:

a nacelle extending from the rotor hub along an axis of rotation of the blades;

wherein the nacelle extends exterior of the duct; and wherein the trailing edge is parabolic shaped with a minimum stator chord length nearest an axis of rotation of the blades.

18. The aircraft of claim 17, wherein at least a portion of the trailing edge extends exterior of the duct.

19. The aircraft of claim 17, wherein the stator further comprising a tip end portion located radially exterior of the inside diameter of the duct opposite the wing tip.

20. The aircraft of claim 17, wherein the stator chord at the duct is equal to a length of a wing chord at the wing tip.

\* \* \* \* \*